(12) United States Patent
Smith et al.

(10) Patent No.: US 11,707,407 B2
(45) Date of Patent: *Jul. 25, 2023

(54) SYSTEM AND METHOD FOR BODILY FLUID CAPTURE AND PRESERVATION

(71) Applicant: Dadi, LLC, New York, NY (US)

(72) Inventors: Thomas Smith, Brooklyn, NY (US); Pepin Gelardi, New York, NY (US); Theodore Ullrich, New York, NY (US); Ross Sloan, Chicago, IL (US)

(73) Assignee: Dadi, LLC, New York, NY (US)

(*) Notice: Subject to any disclaimer, the term of this patent is extended or adjusted under 35 U.S.C. 154(b) by 527 days.

This patent is subject to a terminal disclaimer.

(21) Appl. No.: 16/865,577

(22) Filed: May 4, 2020

(65) Prior Publication Data

US 2020/0261315 A1 Aug. 20, 2020

Related U.S. Application Data

(63) Continuation-in-part of application No. 16/196,385, filed on Nov. 20, 2018, now Pat. No. 11,478,228.

(51) Int. Cl.
*A61J 1/05* (2006.01)
*A61J 1/14* (2023.01)
*A01N 1/02* (2006.01)

(52) U.S. Cl.
CPC .......... *A61J 1/1418* (2015.05); *A61J 1/1468* (2015.05); *A01N 1/0205* (2013.01); *A61J 2200/50* (2013.01)

(58) Field of Classification Search
None
See application file for complete search history.

(56) References Cited

U.S. PATENT DOCUMENTS

| 4,530,816 A | 7/1985 | Douglas-Hamilton |
| 2003/0014982 A1* | 1/2003 | Smith ................... F25D 11/003 62/480 |

(Continued)

FOREIGN PATENT DOCUMENTS

| FR | 2650256 A1 | 2/1991 |
| WO | 2009123889 A1 | 10/2009 |

OTHER PUBLICATIONS

Written Opinion of the International Searching Authority in PCT/US2021/030449 (dated Oct. 7, 2021).

(Continued)

*Primary Examiner* — Paul S Hyun
(74) *Attorney, Agent, or Firm* — Pryor Cashman LLP

(57) ABSTRACT

System and associated method for capturing, preserving, and transporting a bodily fluid, including a collection jar having a base body, a lid body, and a cartridge having a plunger therein and disposed in the lid body, the cartridge housing a preservative when the plunger is in a first plunger position and permitting a release of the preservative into an internal cavity of the collection jar when the plunger is in a second plunger position, and a transportation packaging having an outer container, at least one insulation foam support, at least one phase change material bottle, and at least one collection jar holding tray, where the phase change material bottle has an indented portion corresponding to an indented portion of the collection jar holding tray, and where the collection jar is configured for placement in the at least one collection jar holding tray during transportation.

18 Claims, 11 Drawing Sheets

(56) References Cited

U.S. PATENT DOCUMENTS

| | | | |
|---|---|---|---|
| 2003/0234255 A1* | 12/2003 | Hagopian | B65D 81/3823 |
| | | | 220/62.2 |
| 2006/0254944 A1 | 11/2006 | Kao et al. | |
| 2010/0137741 A1 | 6/2010 | Slowey et al. | |
| 2012/0310113 A1 | 12/2012 | Giddings et al. | |
| 2013/0091890 A1 | 4/2013 | Schryver et al. | |
| 2014/0342371 A1* | 11/2014 | Holmes | A61B 5/150343 |
| | | | 435/7.1 |
| 2017/0000109 A1 | 1/2017 | Xing | |
| 2020/0155126 A1 | 5/2020 | Smith et al. | |

OTHER PUBLICATIONS

International Search Report in PCT/US2021/030449 (dated Oct. 7, 2021).

* cited by examiner

SYSTEM AND METHOD FOR BODILY FLUID CAPTURE AND PRESERVATION

CROSS-REFERENCE TO RELATED APPLICATIONS

The present application is a continuation-in-part of U.S. patent application Ser. No. 16/196,385, filed Nov. 20, 2018, the disclosure of which is incorporated herein by reference in its entirety.

TECHNICAL FIELD

The present invention involves a system and method for capturing and preserving a bodily fluid. More particularly, the present invention involves a system and method for capturing, preserving, and transporting a bodily fluid, such as semen ejaculate, for short or long term storage, subsequent use in in vitro fertilization or other medical procedures and/or testing. Simplicity of use is an important element of the invention as it is intended to be primarily used by ordinary consumers and preservation of the sample is critical.

BACKGROUND OF THE INVENTION

Current means of storing spermatozoa, i.e., sperm or sperm cells, typically involve a remote site for on-premise collection of the specimen, such as at a sperm bank or cryobank. Thus, the interested male must travel to this facility, masturbate while there, and travel back home once finished. This can be time-consuming and uncomfortable, as the interested male must essentially masturbate on command in addition to the facility likely having an unappealing sterile medical ambiance. It would be preferable for the interested male to be able to collect the specimen in the comfort of his home and at his leisure. Yet, of course, preservation of the sample is critical to future use of the same so that collecting at a medical facility is preferred for storage and collecting at one's home is not preferred, at least prior to the present invention. Accordingly, at-home collection kits have been recently developed and available for interested males. However, these kits either have no or poor temperature control elements, such as dry ice packs or cold packs, for maintaining the kit and/or the specimen at an acceptable temperature range or below a maximum. These deficiencies do not adequately consider delays in kit shipment, pick-up, and return, or environmental variations associated with kit destination, e.g., the temperature difference between a user in Minnesota and a user in Florida with storage sites in varying locations with temperatures ranging in those areas. These kits also include numerous components, requiring much more labor and handling by the user and, consequently, leading to greater human error. Therefore, there exists a need for a system and associated method of at-home specimen collection with superior ease of use and precise transportation temperature control.

SUMMARY OF THE INVENTION

In general, in one aspect, the invention features a system for capturing, preserving, and transporting a bodily fluid, including a collection jar having a base body, a lid body configured to attach to the base body to close the collection jar, and a cartridge having a plunger therein and disposed in the lid body, the cartridge housing a preservative when the plunger is in a first plunger position and permitting a release of the preservative into an internal cavity of the collection jar when the plunger is in a second plunger position, where the plunger is configured to move from the first plunger position to the second plunger position by pushing the plunger into the internal cavity, and a transportation packaging having an outer container, at least one insulation foam support disposed in the outer container, at least one phase change material bottle disposed in the outer container, and at least one collection jar holding tray disposed in the outer container, where the phase change material bottle has an indented portion corresponding to an indented portion of the collection jar holding tray, and where the collection jar is configured for placement in the at least one collection jar holding tray during transportation.

Implementations of the invention may include one or more of the following features. The collection jar may further include a threaded attachment mechanism configured to screw the lid body onto the base body to close the collection jar. The preservative may be a commercially available medium including gentamicin, glycerol, and/or albumin. The at least one insulation foam support may include a polyurethane foam. The at least one phase change material bottle may include a phase change material, and the phase change material may be a commercially available phase change material including a functionalized bioPCM, an inorganic material, an organic material, and/or a eutectic material. The transportation packaging may further include at least one absorbent layer. The transportation packaging may include two insulation foam supports, two phase change material bottles, and two collection jar holding trays. The outer container may be a hinged box having a first half and a second half, where each of the first half and the second half includes one insulation foam support, one phase change material bottle, and one collection jar holding tray. The transportation packaging may include an internal device disposed therein and having a first two-factor authentication code, and an external device disposed thereon and having a second two-factor authentication code, the external device being in the form of a seal. The transportation packaging may be configured to maintain a mixture of the bodily fluid and the preservative at a temperature in the range of 15 to 37 degrees Centigrade.

In general, in another aspect, the invention features a method of capturing, preserving, and transporting a bodily fluid, including placing a bodily fluid in an internal cavity of a collection jar, closing the collection jar with the bodily fluid disposed therein, releasing a preservative into the internal cavity of the collection jar, and placing the collection jar with the bodily fluid and released preservative disposed therein into a transportation packaging, where the collection jar includes a base body, a lid body configured to attach to the base body to close the collection jar, and a cartridge having a plunger therein and disposed in the lid body, the cartridge housing a preservative when the plunger is in a first plunger position and permitting a release of the preservative into an internal cavity of the collection jar when the plunger is in a second plunger position, where the plunger moves from the first plunger position to the second plunger position by pushing the plunger into the internal cavity, and where the transportation packaging includes an outer container, at least one insulation foam support disposed in the outer container, at least one phase change material bottle disposed in the outer container, and at least one collection jar holding tray disposed in the outer container, where the phase change material bottle has an indented portion corresponding to an indented portion of the collection jar holding tray, and where the collection jar is placed in the at least one collection jar holding tray during transportation.

Implementations of the invention may include one or more of the following features. The collection jar may further include a threaded attachment mechanism configured to screw the lid body onto the base body to close the collection jar. The preservative may be a commercially available medium including gentamicin, glycerol, and/or albumin. The at least one insulation foam support may include a polyurethane foam. The at least one phase change material bottle may include a phase change material, and the phase change material may be a commercially available phase change material including a functionalized bioPCM, an inorganic material, an organic material, and/or a eutectic material. The transportation packaging may further include at least one absorbent layer. The transportation packaging may include two insulation foam supports, two phase change material bottles, and two collection jar holding trays. The outer container may be a hinged box having a first half and a second half, where each of the first half and the second half includes one insulation foam support, one phase change material bottle, and one collection jar holding tray. The transportation packaging may include an internal device disposed therein and having a first two-factor authentication code, and an external device disposed thereon and having a second two-factor authentication code, the external device being in the form of a seal. The transportation packaging may maintain a mixture of the bodily fluid and the preservative at a temperature in the range of 15 to 37 degrees Centigrade.

DETAILED DESCRIPTION OF THE PREFERRED EMBODIMENTS

Figure 1A:
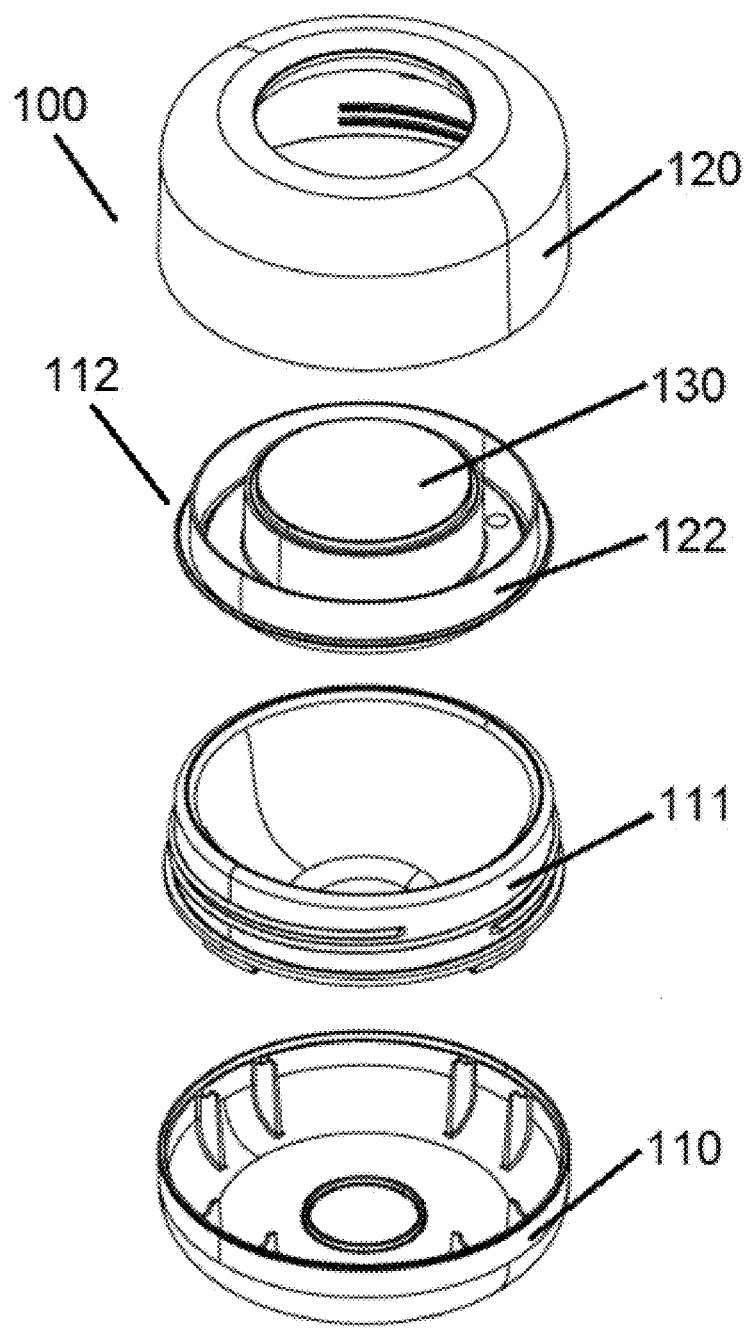
FIG. 1A shows a front perspective exploded view of a collection jar of one embodiment of the present invention.
Figure 1B:
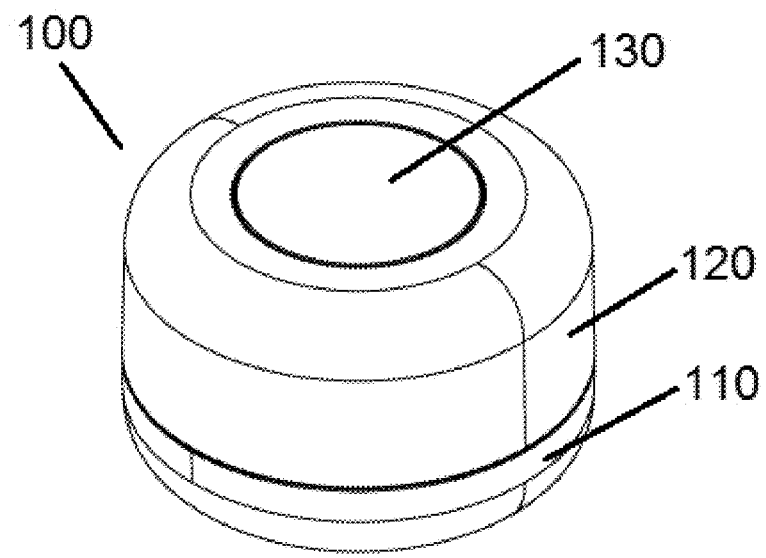
FIG. 1B shows a front perspective view of the collection jar of FIG. 1A.
Figure 1C:
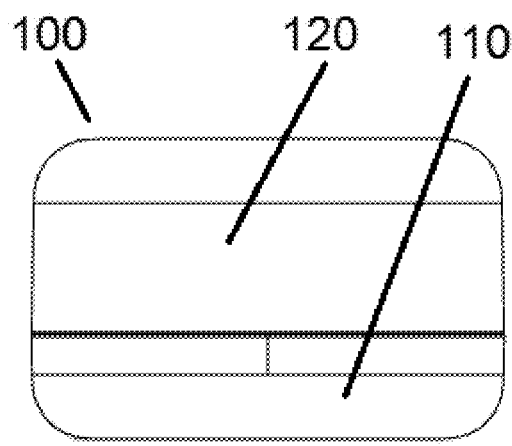
FIG. 1C shows a side view of the collection jar of FIG. 1A.
Figure 1D:
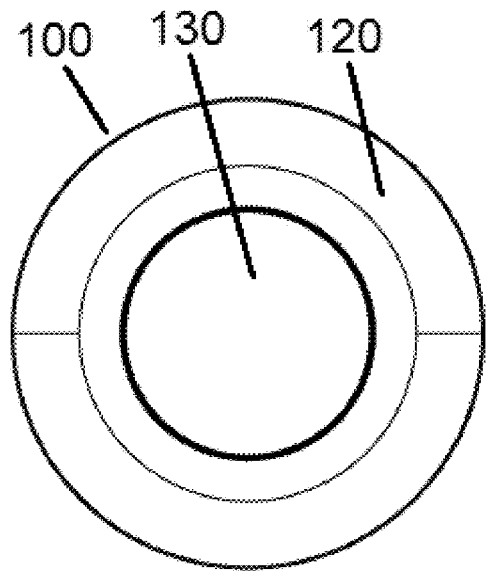
FIG. 1D shows a top view of the collection jar of FIG. 1A.

The present invention relates to a system and associated method for capturing, preserving, and transporting a bodily fluid, including through the use of a collection jar, an associated sealing lid and a transportation packaging, as will be described herein. The collection jar is preferably configured to collect and hold the bodily fluid and a wash solution which may include a short and/or long term specimen preservative. The collection jar is also preferably configured to easily release the wash solution/preservative into the internal cavity of the jar, such as by a simple push button mechanism. The transportation packaging is preferably configured to hold the collection jar in a sufficiently stable position during transportation, both to and from a user and the laboratory for testing and short and long term storage facility. The transportation packaging is also preferably configured to maintain the specimen, as preserved, in the collection jar within an acceptable temperature range, preferably but not exclusively between 15 to 37 degrees Centigrade. The overall process may cover transporting the collection jar in a transportation packaging to a user, removing the collection jar from the transportation packaging, depositing a bodily fluid in the collection jar, releasing the preservative, and transporting the filled collection jar in the transportation packaging to another location, such as a testing laboratory or storage facility. In a preferred embodiment, the bodily fluid is semen ejaculate.

FIGS. 1-4 show different views of systems of several embodiments of the present invention. In these embodiments, a system 1 includes a collection jar 100 and a transportation packaging 200. Collection jar 100 may be disposed within, and removed from, transportation packaging 200. The collection jar 100 is meant to be centrally housed within the transportation packaging 200.

In FIG. 1, components of collection jar 100 include a base body 110, a lid body 120 that attaches to base body 110 via mating screw threads on internal container body 111. A threaded attachment mechanism may be included in collection jar 100 to permit lid body 120 to screw onto base body 110 and internal container body 111 to open and close jar 100. A cartridge 112 including plunger button 130 on cartridge body 122 is disposed within lid body 120, with plunger button 130 being exposed through an opening in lid body 120. The base body 110 with internal container body 111 includes a central holding area, similar to many cosmetic holding jars, now commercially available. The lid body 120 mates and closes off the interior of the collection jar. In the exploded view of FIG. 1A, collection jar 100 includes base body 110 and an internal container body 111 that connects with base body 110. Internal container body 111 snaps or screws into the base body 110 and provides a central depression area for the specimen. Collection jar 100 also includes outer lid body 120 and cartridge 112, described in greater detail with regards to FIG. 2.

Figure 2A:
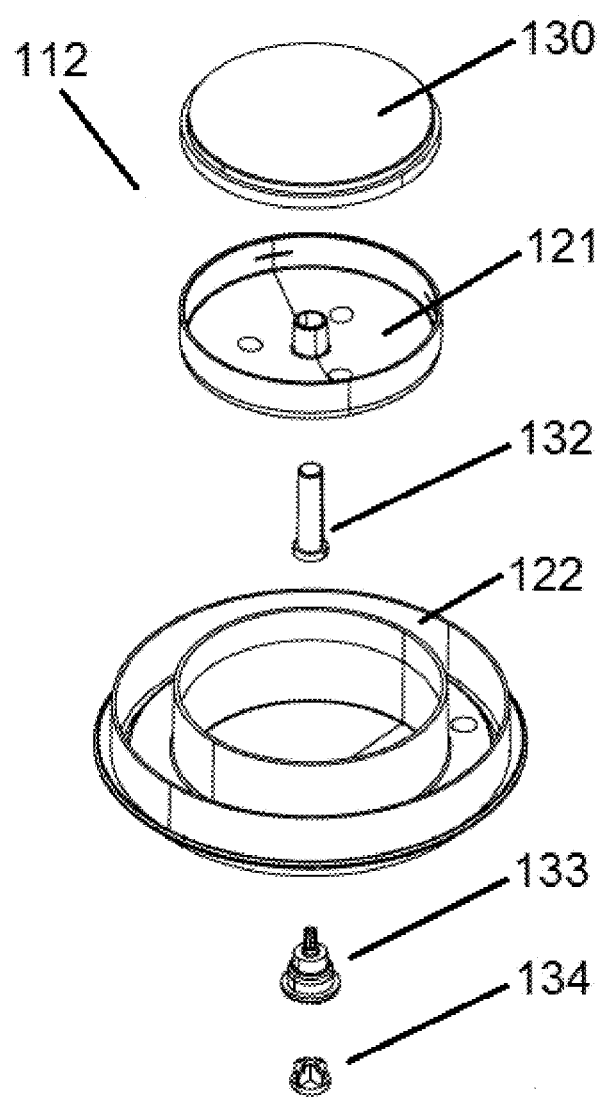
FIG. 2A shows a front perspective exploded view of a collection jar cartridge of one embodiment of the present invention.
Figure 2B:
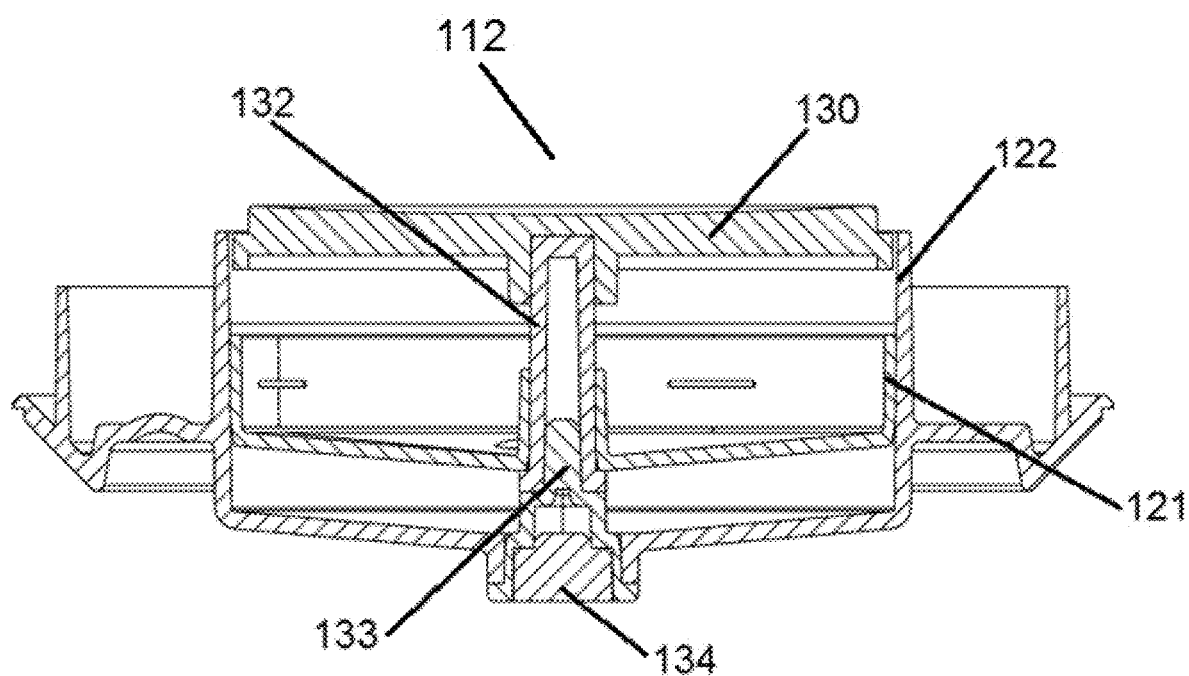
FIG. 2B shows a side cross-sectional view of the collection jar cartridge of FIG. 2A.
Figure 3A:
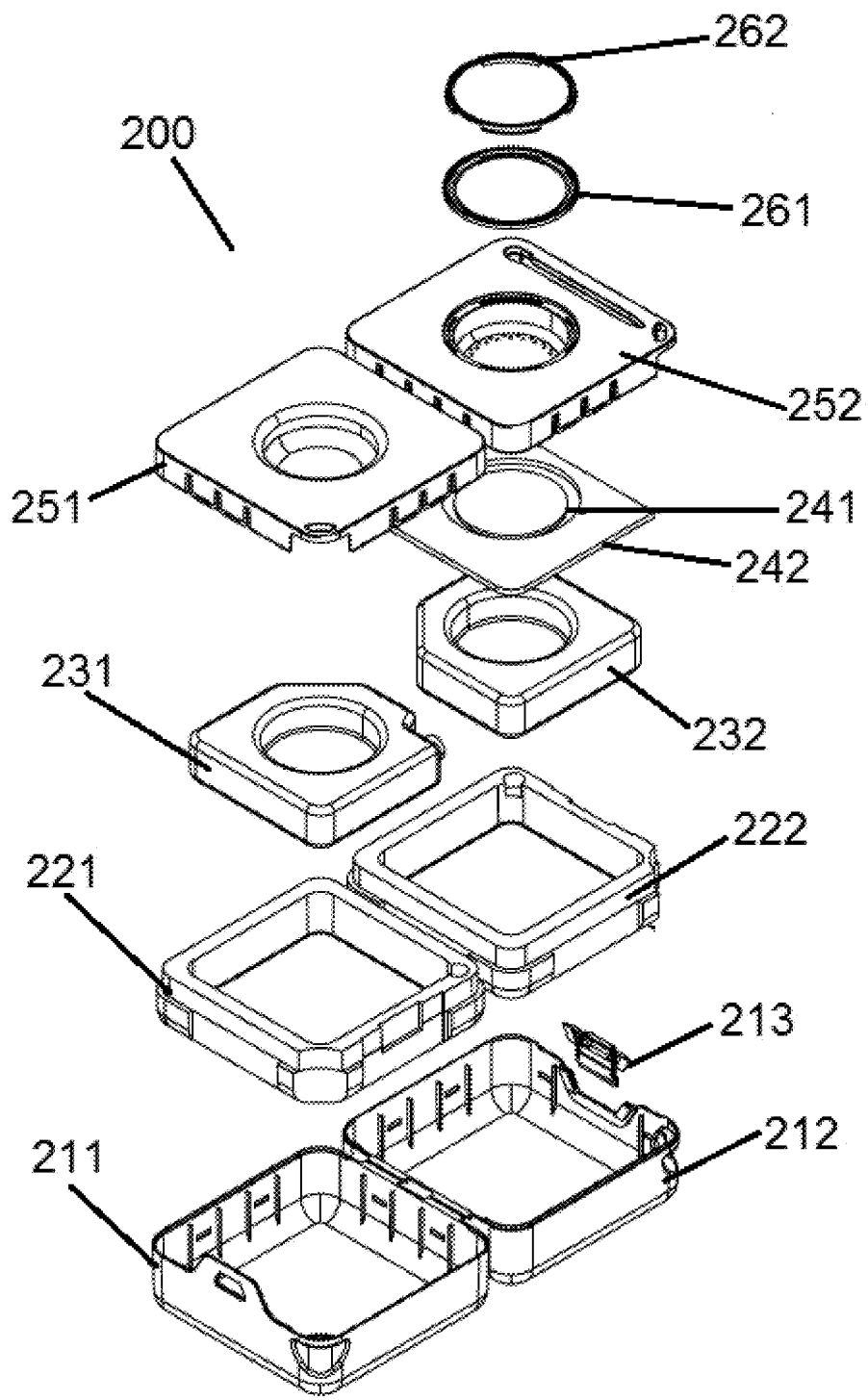
FIG. 3A shows a front perspective exploded view of a collection jar transportation packaging of one embodiment of the present invention.
Figure 3B:
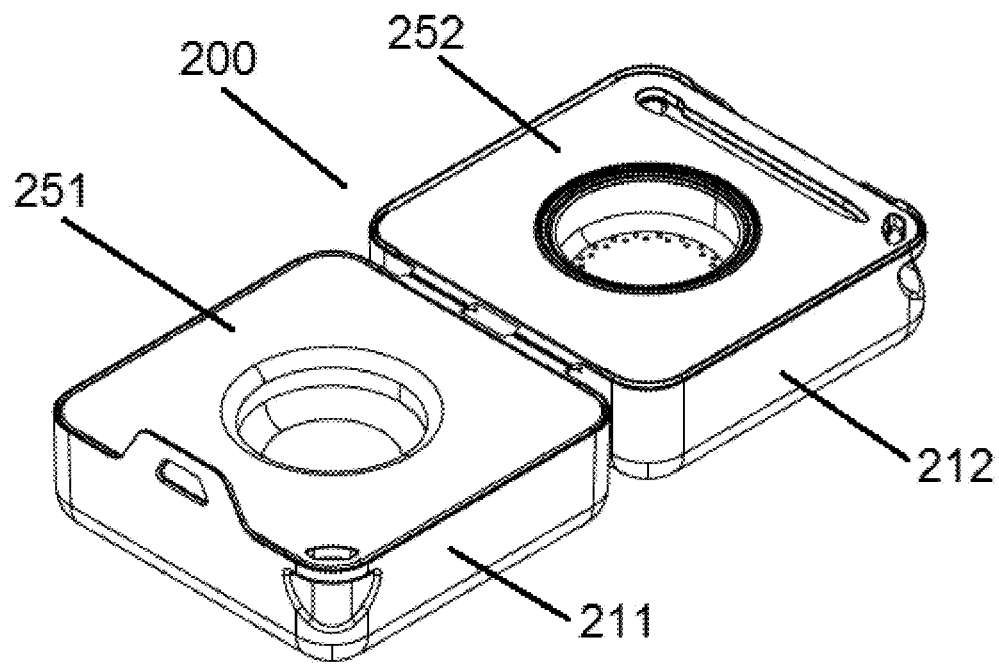
FIG. 3B shows a front perspective view of the collection jar transportation packaging of FIG. 3A.
Figure 3C:
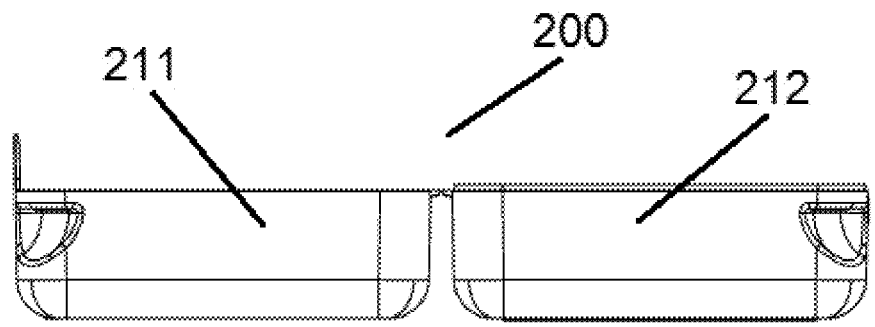
FIG. 3C shows a side view of the collection jar transportation packaging of FIG. 3A.
Figure 3D:
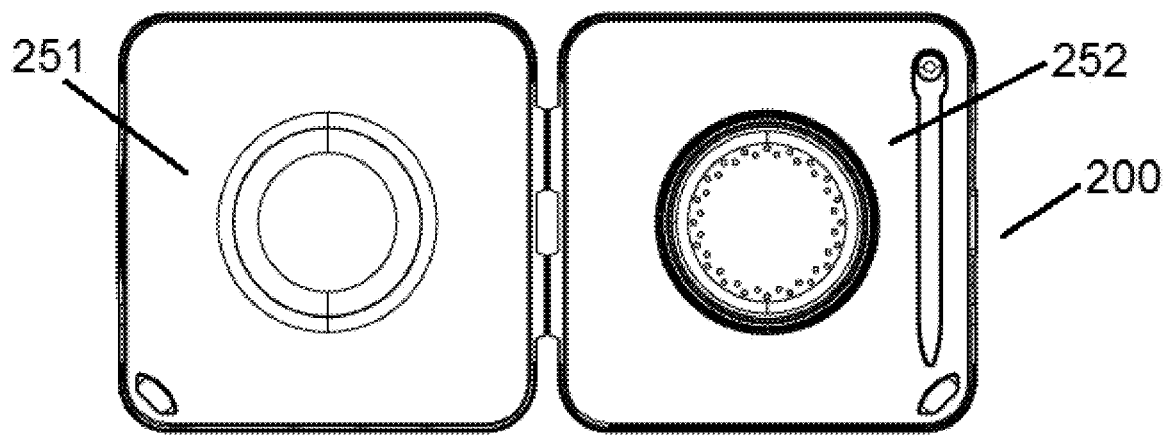
FIG. 3D shows a top view of the collection jar transportation packaging of FIG. 3A.
Figure 4A:
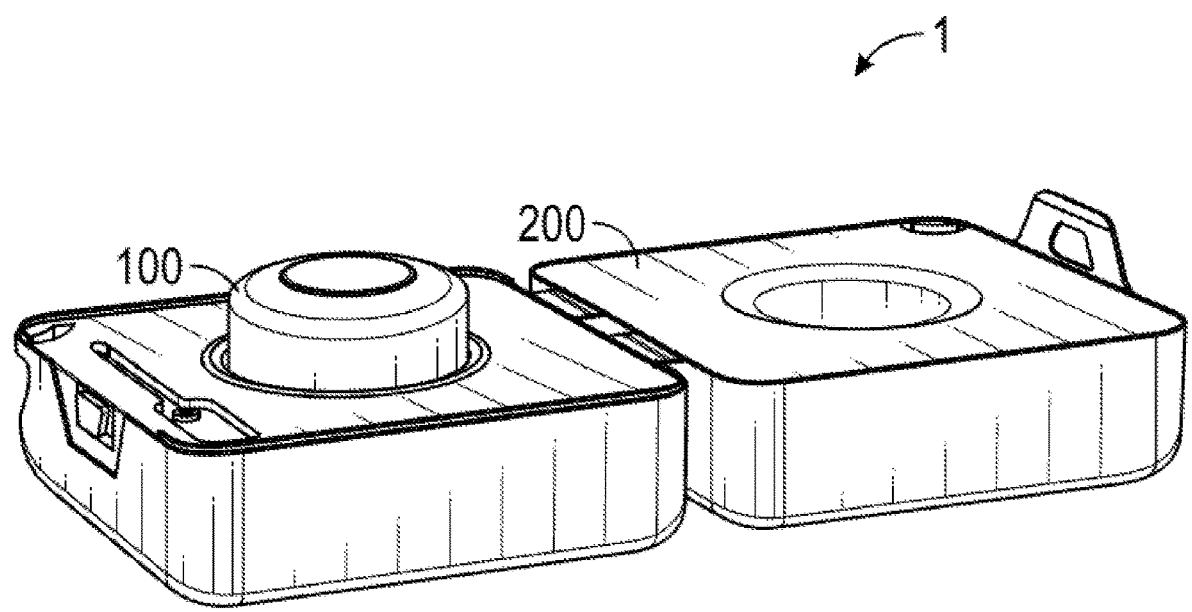
FIG. 4A shows a front perspective view of a system of one embodiment of the present invention, the system including a collection jar and a collection jar transportation packaging.
Figure 4B:
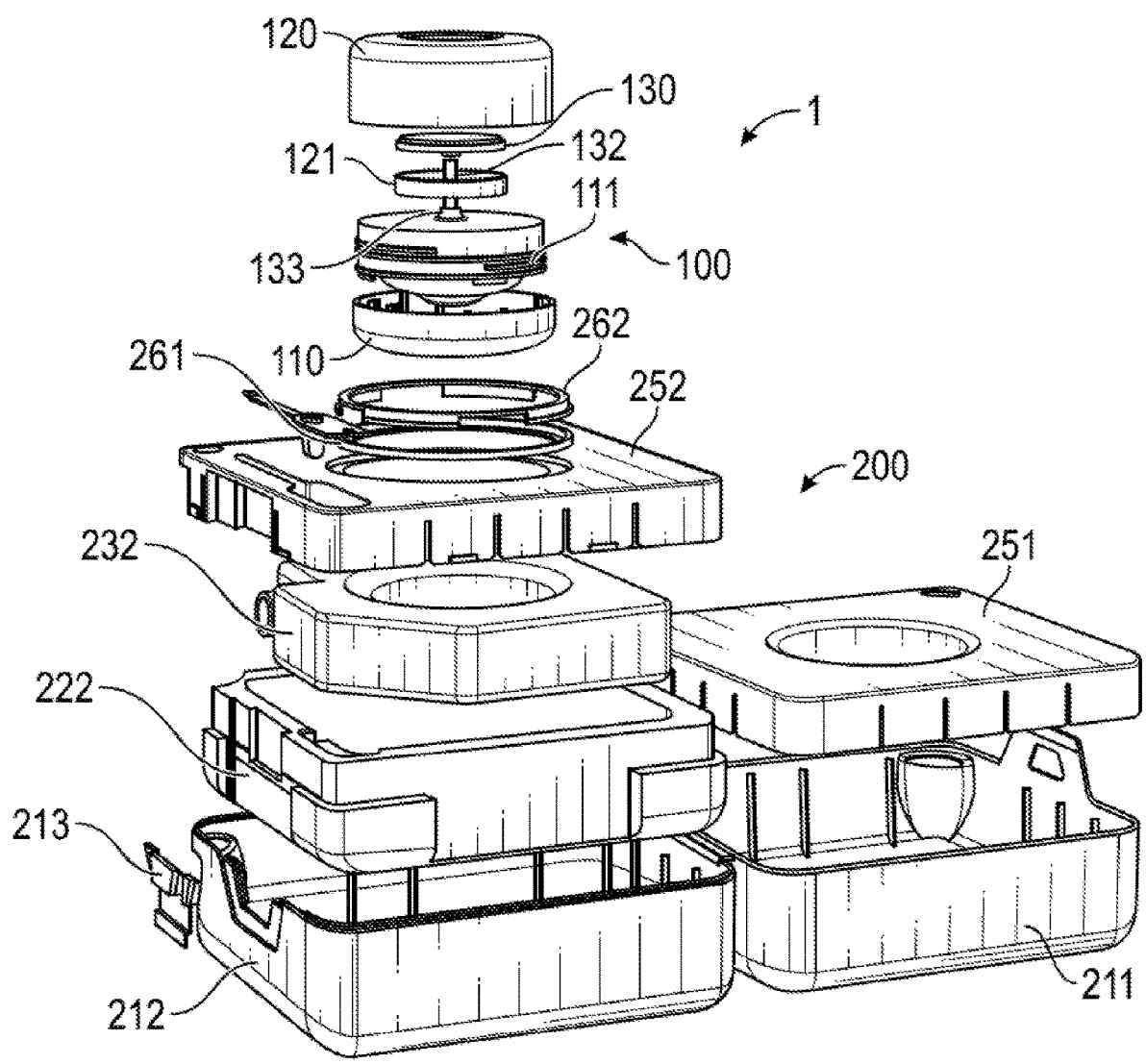
FIG. 4B shows a front perspective exploded view of the system of FIG. 4A.
Figure 4C:
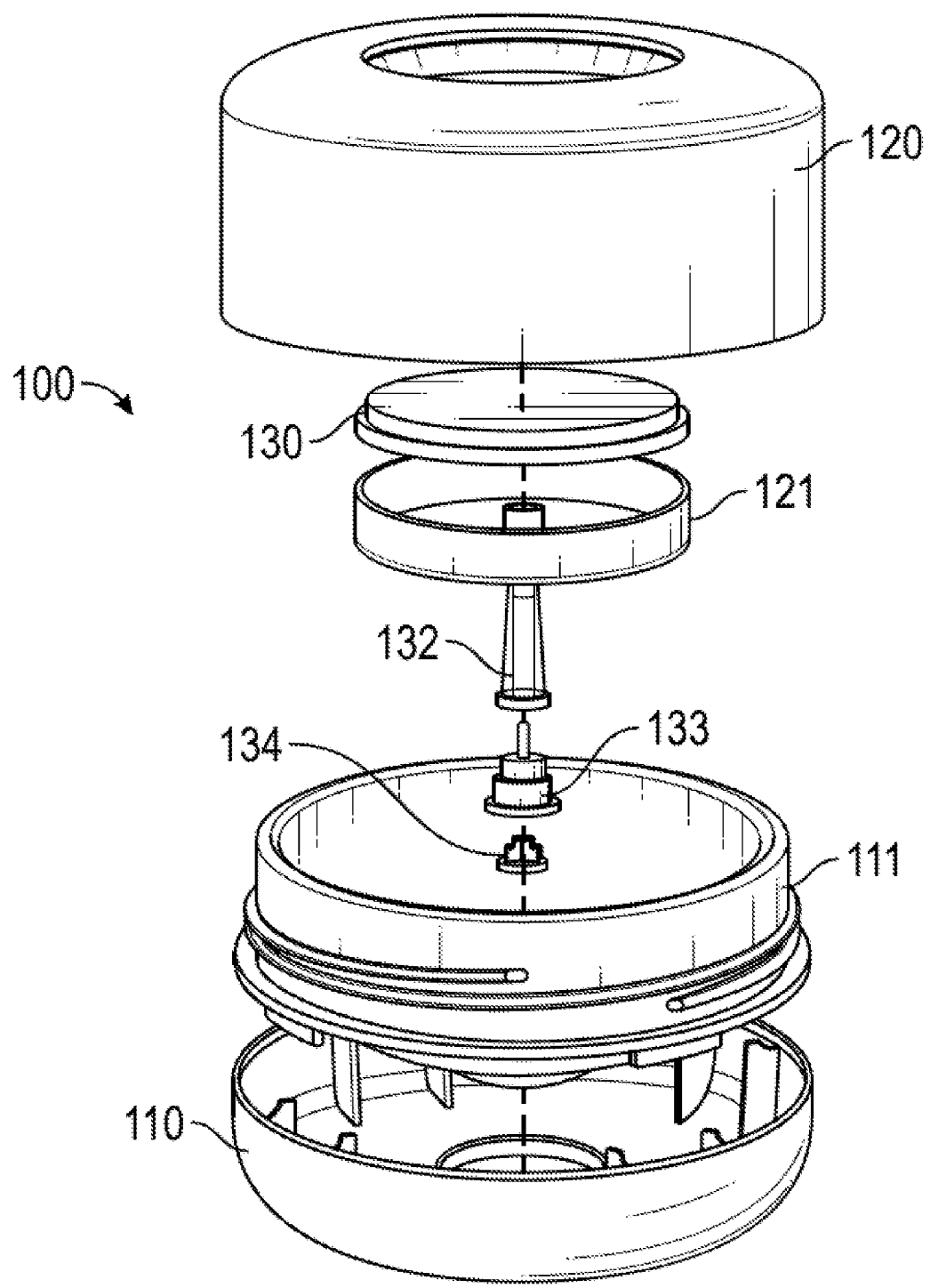
FIG. 4C shows a front perspective exploded view of the collection jar of the system of FIG. 4A.
Figure 4D:
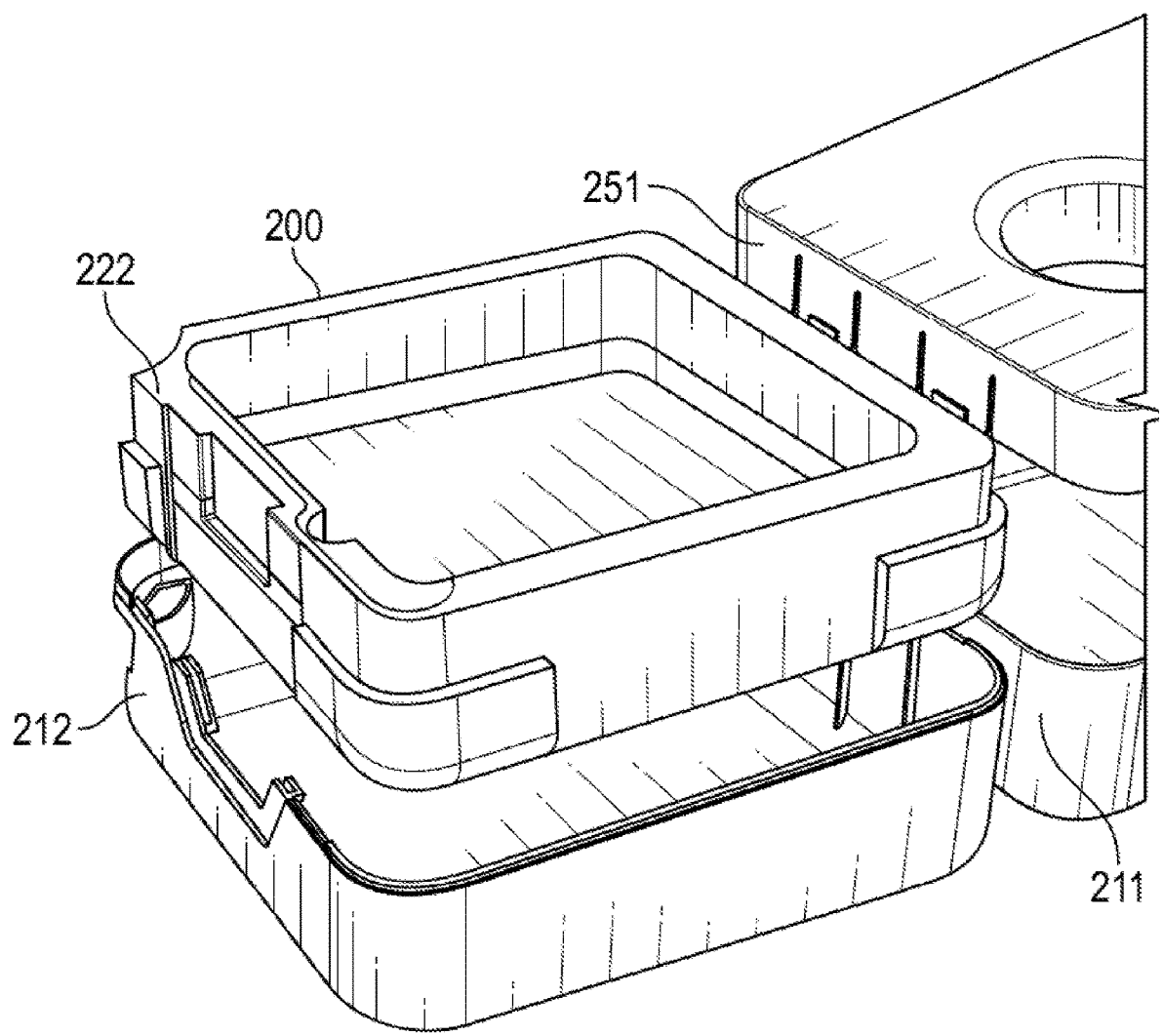
FIG. 4D shows a front perspective exploded view of a portion of the collection jar transportation packaging of the system of FIG. 4A.

In FIG. 2, components of collection jar cartridge 112 include a cartridge body 122, an internal container seal 121, plunger button 130, a plunger 132, a plunger plug 133, and a plunger endcap 134. FIG. 2B is a cross-sectional view of collection jar cartridge 112. Cartridge 112 may house a substance, such as a wash solution, a preservative, a wash solution containing a preservative, and the like. The substance may include one or more preservatives, nutrients, and/or other compounds for maintaining the health of the bodily fluid for several days, including through return transportation. A selected preservative may be a commercially available medium, such as those including gentamicin, glycerol, and/or albumin, and/or such as those produced by IRVINE SCIENTIFIC (e.g., MULTIPURPOSE HANDLING MEDIUM), VITROLIFE (e.g., SPERMRINSE), COOPERSURGICAL, VETOQUINOL, THERMOFISHER SCIENTIFIC (e.g., Gibco Cell Culture Media), and the like. The substance may be loaded into cartridge 112 through the use of a circular jig, particularly a circular jig in which cartridge body 122 may sit inverted with plunger plug 133 having been removed such that the substance may be added into the central opening available by the removal of plug 133 and sealed therein by the reinsertion of plug 133.

A user may collect his or her bodily fluid in collection jar 100, such as onto the depression in internal container body 111, and close collection jar 100, such as by screwingly attaching lid body 120 to base body 110. At this point, the user may elect to release the preservative or wash substance housed in cartridge 112. To do so, the user may press or push plunger button 130 to move plunger 132 from the first position to a second position, i.e., the depressed position. When the plunger is in the second position, an internal cavity of cartridge 112 is in fluid communication, i.e., opened to, the depression of the internal container body 111. The internal cavity of collection jar 100, such as internal container body 111, and the preservative substance, may secrete from cartridge 112 and into the internal cavity of collection jar 100, thereby mixing with the bodily fluid disposed therein. In one embodiment of the present invention, the substance-release mechanism is irreversible, i.e., plunger button 130 can only be pressed once and plunger 132 cannot be reversed from the second plunger position back to the original first plunger position.

FIG. 3 shows an exploded view of a transportation packaging 200. In FIG. 3, transportation packaging 200 includes a first outer container part 211 and a second outer container part 212, which together form the outer container, such as one in the form of a hinged box, optionally including a locking mechanism such as latch 213. Additionally, transportation packaging 200 includes a first assembly disposed in first outer container part 211 that is formed of an insulation foam 221, phase change material bottle 231, and collection jar holding tray 251. Similarly, transportation packaging 200 includes a second assembly disposed in second outer container part 212 that is formed of an insulation foam 222, phase change material bottle 232, and collection jar holding tray 252. Absorbent layers may be included beneath collection jar holding tray 252, such as jar containment absorbent layer 241 and tray absorbent layer 242. Tray 252 may include a plurality of small holes to permit any spillage to exit tray 252 and be absorbed by the absorbent layers. The absorbent layers are preferably foam with a capacity to absorb more than 20 mL of spillage. A wiper gasket 262 may be included in connection with collection jar holding tray 252, with gasket retainer 261 being utilized for securing gasket 262 to tray 252.

Collection jar holding trays 251 and 252 are preferably configured to hold or cradle, including during transportation, collection jar 100 within a centrally recessed or indented portion of trays 251 and 252. Phase change material bottles 231 and 232 may also have a corresponding centrally recessed or indented portion such that indented portions of trays 251 and 252 are disposed in indented portions of phase change material bottles 231 and 232, respectively. Insulation foam 221 and 222 may have a central opening. This shape permits phase change material bottles 231 and 232 to be surrounded by, or sit in, insulation foam 221 and 222, thereby eliminating or reducing thermal leakage at side portions and slowing down heat transfer between the ambient environment and the phase change material. Acceptable types of foam for utilization as the foam insulation include polyurethane foam and other foams having low density and low thermal conductivity.

A phase change material is preferably disposed in phase change material bottles 231 and 232, and the selected phase change material may be a commercially available phase change material, including but not limited to a functionalized bioPCM, an inorganic material, an organic material, a eutectic material. Examples include SAVENRG PCM-OM18P (RGEES, LLC), SAVENRG PCM-HS22P (RGEES, LLC), and the like. In one embodiment, it is preferable that the phase change material be selected such that both the preservative first housed in collection jar 100 as well as the bodily fluid-preservative mixture subsequently housed in collection jar 100 are maintained at a desired temperature, such as a temperature in the range of 15 to 37 degrees Centigrade, during transportation. The desired temperature range may be any acceptable temperature range and may be determined based on the substance or object being housed and transported as well as the associated phase change material selected for this substance or object. In one embodiment of the present invention, the system is capable of maintaining the bodily fluid-preservative mixture at a temperature above 15 degrees Centigrade for more than 30 hours in an ambient temperature of 7 degrees Centigrade and for more than 12 hours in an ambient temperature of 15 degrees Centigrade.

FIG. 4 shows a system 1 according to one embodiment of the present invention. FIGS. 4A-4B show system 1 including collection jar 100, collection jar transportation packaging 200, and associated components, including those previously described. FIG. 4C shows collection jar 100 and associated components of this embodiment. FIG. 4D shows a portion of collection jar transportation packaging 200, particularly that portion which includes insulation foam 222.

While a primary application of the system and associated method of the present invention is the collection and transportation of semen ejaculate, this system and method may be utilized with respect to other bodily fluids that can be collected through home use and that benefit from greater temperature control during transportation, either to or from the user. Other bodily fluids and the like may include amniotic fluid, aqueous humour, vitreous humour, bile, blood, blood plasma, blood serum, cerebrospinal fluid, cerumen or earwax, chyle, chyme, endolymph, perilymph, exudates, feces, female ejaculate, gastric acid, gastric juice, lymph, mucus, pericardial fluid, peritoneal fluid, pleural fluid, pus, rheum, saliva, sebum or skin oil, serous fluid, semen, serum, smegma, sputum, synovial fluid, sweat, tears, urine, vaginal secretion, vaginal discharge, vomit, cord blood, and stem cells. Additionally, this system and method may be utilized in non-human applications, e.g., for animal bodily fluids, including but not limited to horse or bull semen. Additionally, this system and method may be utilized in non-medical applications involving multiple transportations with a need for greater temperature control, such as meats, beverages, and luxury goods at risk of damage by extreme temperatures.

Figure 5A:
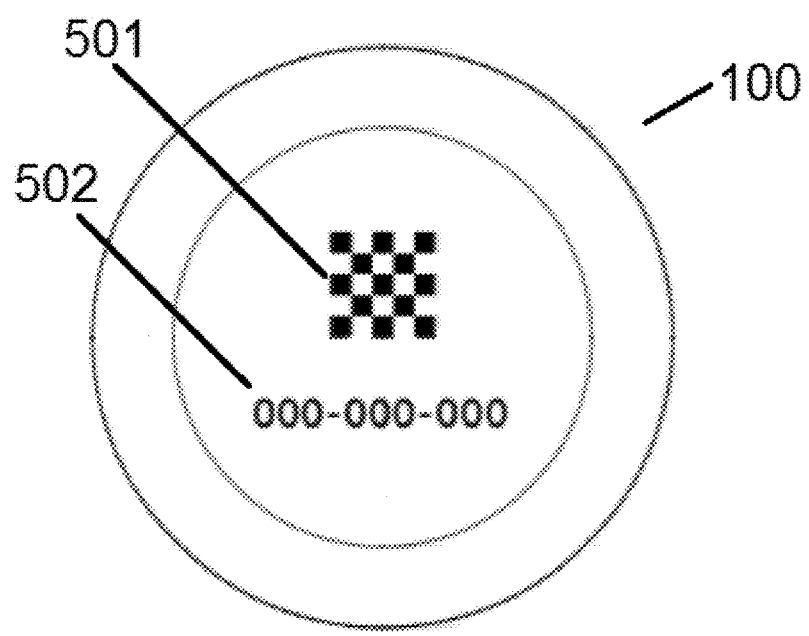
FIG. 5A shows aspects of a two-factor authentication code system utilized in connection with a collection jar of the present invention.
Figure 5B:
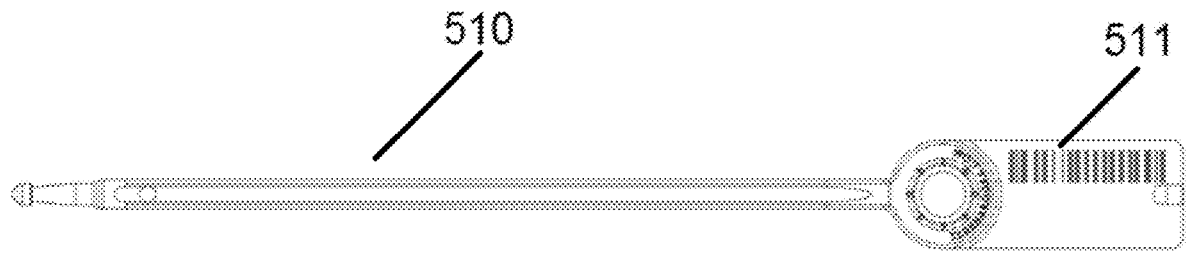
FIG. 5B shows aspects of the two-factor authentication code system utilized in connection with a collection jar transportation packaging of the present invention.

As certain applications of the present invention involve sensitive substances, of which privacy and security is a significant concern, the present invention also provides for the inclusion of a two-factor authentication mechanism to be utilized with the system, such as for securing and tamper-proofing the system during transportation. One such embodiment is reflected in FIG. 5. FIG. 5A illustrates aspects of a two-factor authentication code known by the ERP system that is utilized in connection with collection jar 100, specifically QR code 501 and numeric code 502 disposed on collection jar 100. FIG. 5B illustrates aspects of the two-factor authentication code known by the ERP system that is utilized in connection with transportation packaging 200, specifically seal 510 having barcode 511 disposed thereon. Seal 510 may be originally packaged in an open position within transportation packaging 200 when being transported to a user. Upon the user preparing to return or further transport transportation packaging 200 having collection jar 100 disposed therein, the user may seal transportation packaging 200 with seal 510 at portions thereon, including but not limited to clasps, loops, hooks, and the like arranged on transportation packaging 200. A preferred embodiment is the inclusion of two hardened clasps on transportation packaging 200 capable of holding the user-applied seal in place. The ERP system is configured to match the known codes. Codes may be scanned and paired to authenticate the substances at one or more times in the transportation process, including prior to transit, after transit to the user, and/or after transit from the user. The authentication system of the present invention is not limited to the embodiment of FIG. 5, particularly the use of QR codes, barcodes, and numeric codes, and as such any industry-acceptable two-factor authentication mechanism may be utilized in connection with collection jar 100 and transportation packaging 200.

The embodiments and examples above are illustrative, and many variations can be introduced to them without departing from the spirit and scope of the disclosure or from the scope of the invention. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the drawings and descriptive matter, in which there is illustrated a preferred embodiment of the invention.

What is claimed is:

1. A system for capturing, preserving, and transporting a bodily fluid, comprising:
   a collection jar comprising:
     a base body;
     a lid body configured to attach to the base body;
     a cartridge having a plunger therein and disposed in the lid body, the cartridge housing a preservative when the plunger is in a first plunger position and permitting a release of the preservative into an internal cavity of the collection jar when the plunger is in a second plunger position; and
     the preservative;
     wherein the plunger is configured to move from the first plunger position to the second plunger position by pushing the plunger into the internal cavity; and
   a transportation packaging comprising:
     an outer container;
     at least one insulation foam support disposed in the outer container;
     at least one phase change material bottle disposed in the outer container;
     and at least one collection jar holding tray disposed in the outer container;
     wherein the phase change material bottle has an indented portion corresponding to an indented portion of the collection jar holding tray;
   wherein the collection jar is configured for placement in the at least one collection jar holding tray during transportation.

2. The system of claim 1, wherein the collection jar further comprises a threaded attachment mechanism configured to screw the lid body onto the base body.

3. The system of claim 1, wherein the preservative is a commercially available medium comprising gentamicin, glycerol, and/or albumin.

4. The system of claim 1, wherein the at least one insulation foam support comprises a polyurethane foam.

5. The system of claim 1, wherein the at least one phase change material bottle includes a phase change material, and wherein the phase change material is a commercially available phase change material comprising a functionalized bioPCM, an inorganic material, an organic material, and/or a eutectic material.

6. The system of claim 1, wherein the transportation packaging further comprises at least one liquid absorbent layer.

7. The system of claim 1, wherein the transportation packaging comprises two insulation foam supports, two phase change material bottles, and two collection jar holding trays.

8. The system of claim 7, wherein the outer container is a hinged box having a first half and a second half, and wherein each of the first half and the second half includes one insulation foam support, one phase change material bottle, and one collection jar holding tray.

9. The system of claim 1, wherein the transportation packaging includes an internal device disposed therein and having a first two-factor authentication code, and wherein the transportation packaging includes an external device disposed thereon and having a second two-factor authentication code, the external device being in the form of a seal.

10. A method of capturing, preserving, and transporting a bodily fluid, comprising:
    placing a bodily fluid in an internal cavity of a collection jar;
    closing the collection jar with the bodily fluid disposed therein;
    releasing a preservative into the internal cavity of the collection jar; and
    placing the collection jar with the bodily fluid and released preservative disposed therein into a transportation packaging;
    wherein the collection jar comprises:
      a base body;
      a lid body configured to attach to the base body;
      a cartridge having a plunger therein and disposed in the lid body, the cartridge housing a preservative when the plunger is in a first plunger position and permitting a release of the preservative into an internal cavity of the collection jar when the plunger is in a second plunger position; and
      the preservative;
      wherein the plunger moves from the first plunger position to the second plunger position by pushing the plunger into the internal cavity; and
    wherein the transportation packaging comprises:

an outer container;
at least one insulation foam support disposed in the outer container;
at least one phase change material bottle disposed in the outer container;
and at least one collection jar holding tray disposed in the outer container;
wherein the phase change material bottle has an indented portion corresponding to an indented portion of the collection jar holding tray;
wherein the collection jar is placed in the at least one collection jar holding tray during transportation.

11. The method of claim 10, wherein the collection jar further comprises a threaded attachment mechanism configured to screw the lid body onto the base body.

12. The method of claim 10, wherein the preservative is a commercially available medium comprising gentamicin, glycerol, and/or albumin.

13. The method of claim 10, wherein the at least one insulation foam support comprises a polyurethane foam.

14. The method of claim 10, wherein the at least one phase change material bottle includes a phase change material, and wherein the phase change material is a commercially available phase change material comprising a functionalized bioPCM, an inorganic material, an organic material, and/or a eutectic material.

15. The method of claim 10, wherein the transportation packaging further comprises at least one liquid absorbent layer.

16. The method of claim 10, wherein the transportation packaging comprises two insulation foam supports, two phase change material bottles, and two collection jar holding trays.

17. The method of claim 16, wherein the outer container is a hinged box having a first half and a second half, and wherein each of the first half and the second half includes one insulation foam support, one phase change material bottle, and one collection jar holding tray.

18. The method of claim 10, wherein the transportation packaging includes an internal device disposed therein and having a first two-factor authentication code, and wherein the transportation packaging includes an external device disposed thereon and having a second two-factor authentication code, the external device being in the form of a seal.

* * * * *